United States Patent [19]

Gardner

[11] Patent Number: 5,326,379
[45] Date of Patent: Jul. 5, 1994

[54] HEATING AND COOKING APPARATUS AND FUEL COMPOSITION FOR USE THEREIN

[76] Inventor: David H. Gardner, 2210 Seven Oaks Dr., Houston, Tex. 77339

[21] Appl. No.: 40,923

[22] Filed: Mar. 31, 1993

[51] Int. Cl.⁵ .............................................. C10L 1/00
[52] U.S. Cl. ...................................... 44/540; 44/445; 44/629
[58] Field of Search ................ 44/451, 629, 436, 445, 44/540, 545

[56] References Cited

U.S. PATENT DOCUMENTS 2,965,096 12/1960 Barton ................................... 126/25
4,624,633 11/1986 Bandel ................................. 431/320

FOREIGN PATENT DOCUMENTS 0007989 of 1889 United Kingdom .................. 44/540
0011765 of 1895 United Kingdom .................. 44/540
0014947 of 1905 United Kingdom .................. 44/540
0481929 3/1938 United Kingdom .................. 44/540

*Primary Examiner*—Prince Willis, Jr.
*Assistant Examiner*—Cephia D. Toomer
*Attorney, Agent, or Firm*—Browning, Bushman, Anderson & Brookhart

[57] ABSTRACT

A fuel composition comprising a non-combustible, substantially heat resistant pervious substrate and an amount of propylene glycol disposed on the substrate sufficient to fill the majority of the surface interstices present in the substrate and an apparatus for providing a heat source suitable for cooking comprising a container having a liquid impervious bottom wall and a peripheral side wall extending generally upward from the bottom wall to define a container mouth, a non-combustible, substantially heat resistant pervious substrate disposed in the container and propylene glycol disposed on the substrate.

7 Claims, 1 Drawing Sheet

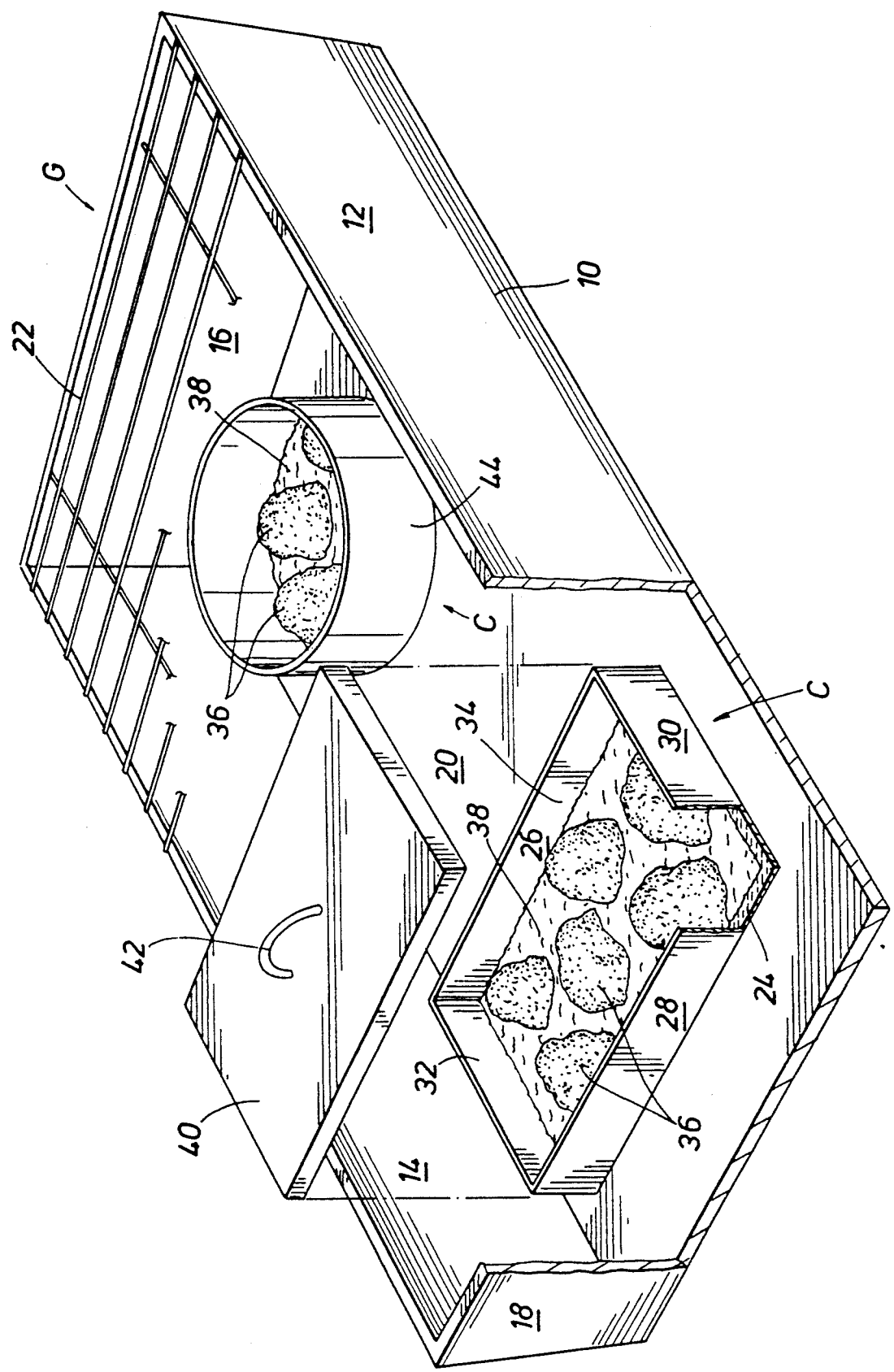

HEATING AND COOKING APPARATUS AND FUEL COMPOSITION FOR USE THEREIN

BACKGROUND OF THE INVENTION

1. Field of the Invention

The present invention relates to a fuel composition and an apparatus incorporating said fuel composition. More particularly, the present invention relates to a fuel composition and apparatus incorporating said fuel composition that is environmentally safe and inherently less dangerous.

2. Description of the Prior Art

There are numerous prior art portable cooking and heat generating apparatuses known. For example, typical of such portable cooking/heating devices include charcoal grills, propane and/or natural gas grills, camping stoves, etc. For the most part, these portable, prior art cooking devices employ fuel compositions, e.g., propane, natural gas, naphtha liquid (charcoal lighter) that are highly flammable. Invariably, these highly flammable materials used in portable cooking apparatuses are hydrocarbon in nature and frequently, because of incomplete combustion, tend to produce sooty smoke, which is environmentally undesirable. Further, in the case of widely used cooking apparatuses employing charcoal and conventional, liquid charcoal lighter, there is always the possibility that some of the liquid charcoal lighter is simply vaporized and picked up by the food being cooked. As is well known, charcoal lighter, and for that matter most hydrocarbons, are toxic if ingested. A further problem with cooking apparatuses that employ charcoal and liquid charcoal lighter as a fuel source is the fact that, because the charcoal is combustible, it leaves an ash that frequently causes messy disposal problems.

The safety hazards associated with hydrocarbon fuels are well known. Propane tanks, if not handled properly, can create a serious explosion problem; liquid charcoal lighter, when used improperly, can result in flare-up and severe burns to the users.

Obviously, what is needed is a portable cooking/heating apparatus and fuel or heat source that is non-toxic, minimizes or eliminates explosion hazards, minimizes clean-up and disposal problems and is environmentally friendly.

SUMMARY OF THE INVENTION

It is therefore an object of the present invention to provide an improved, portable apparatus for cooking and/or generating heat.

Another object of the present invention is to provide an improved fuel composition that can be used in a portable cooking apparatus.

Still a further object of the present invention is to provide a fuel composition that minimizes explosion and environmental hazards.

The above and other objects of the present invention will become apparent from the drawings, the description given herein and the appended claims.

In one aspect, the present invention provides a fuel composition comprising a non-combustible, generally heat resistant or impervious substrate of a porous or pervious nature and propylene glycol disposed on said substrate.

In another aspect, the present invention provides an apparatus that can be used for portable cooking applications comprising a container having a bottom wall and a peripheral side wall extending upwardly from said bottom wall to form a mouth of the container, a non-combustible, generally heat impervious, porous substrate disposed in the container and propylene glycol disposed on said substrate.

BRIEF DESCRIPTION OF THE FIGURE

The single FIGURE is a perspective view of the apparatus of the present invention as used in a portable grill and showing an amount of liquid propylene glycol on the bottom wall of the container.

DESCRIPTION OF THE PREFERRED EMBODIMENT

The fuel/heating composition of the present invention comprises two main components, propylene glycol (1,2-propanediol) and a non-combustible, substantially heat impervious, porous substrate. The substrate acts as a carrier for the combustible propylene glycol and, once heated by the burning propylene glycol, as a source of radiant heat. Thus, while the substrate, in and of itself, supplies no net heat because it is non-combustible, it acts (because of its porosity) to provide an expanded surface area upon which the propylene glycol is deposited and facilitates the burning of the propylene glycol. Once the propylene glycol is lit in a conventional manner such as by using a match, and after the propylene glycol has burned sufficiently, the substrate is heated to the point where it acts to vaporize propylene glycol disposed in the interstices of the generally porous substrate, thereby facilitating further burning of the propylene glycol.

It will be apparent that once all of the propylene glycol on the substrate has been burned, the substrate will remain as a radiant heat source for an appreciable amount of time because of the fact that it is porous and will have been heated generally throughout by the burning propylene glycol.

The substrates that are useful in the fuel compositions of the present invention, as noted above, are non-combustible, generally heat impervious and generally porous or pervious, i.e., it contains surface interstices, pores or pockets into which the propylene glycol can migrate. While the substrate can take many different physical forms, preferably it is in the form of a plurality of chunks or pieces of material possessing the qualities noted above. Numerous different types of substances or materials can form the substrate. For the most part, the material of the substrate will be inorganic in nature. For example, the substrate can be formed of ceramic-like materials, metals, minerals, etc. Porous substrates made of materials such as alumina, silica and other such ceramic-like materials can be employed. Additionally, porous substrates made of metals such as metal sponges, expanded metal, etc., can also be used. Naturally occurring minerals such as pumice, fire clay, etc., can also be used as a substrate. The substrate can be synthetic or natural in nature. For example, a desired substrate is a commerically available product sold for use in gas and propane fired portable or outdoor cooking grills referred to as "lava rock."

As noted, the substrate must be non-combustible in the sense that it does not burn or significantly change composition during the cooking and/or heating process. In this regard, it is to be observed that most substrates of the type under consideration, after long and repeated usage, may undergo some degree of thermal degradation necessitating their replacement in the composition. The substrate must also be substantially heat impervious, i.e., the burning propylene glycol will not cause it to fuse or otherwise undergo significant physical alteration. The substrate must also be porous or pervious, i.e., it must be of a material that has surface pores, interstices or voids that can be penetrated by the propylene glycol. Thus, smooth, substantially non-porous materials, even though being non-combustible and essentially heat impervious, will not form suitable substrates. In many respects, the substrate will act as a refractory and, indeed, materials used as refractories, provided that they have or are made to have suitable porosity, can be employed.

As noted, the substrate can take virtually any physical form that allows for sufficient surface area due to porosity and configuration such that a sufficient amount of propylene glycol can be deposited on the substrate. Conveniently, and in the preferred case, the substrate can be in the form of pieces of non-combustible materials of the type described above that can be regular or irregular in shape and size. As noted, a convenient substrate is commerically available and widely known as "lava rock," which is sold as a plurality of generally irregularly shaped pieces, generally non-uniform in size. Lava rock is believed to be formed of a pumice-like material and is highly porous, i.e., possesses a highly irregular outer surface providing a vast number of surface interstices.

The fuel composition may be prepared by immersing the substrate in the propylene glycol and then depositing the substrate into the cooking/heating apparatus. Alternately, the substrate can be disposed in the cooking apparatus and the propylene glycol poured over the surface of the substrate in an amount sufficient to substantially fill at least the majority of the pores or interstices of the substrate.

It was unexpected that the propylene glycol, which has a flash point of around 225° F. (and therefore is considered non-flammable) could be used in an effective fuel composition. As was pointed out above, most fuels and fuel compositions used in portable or outdoor cooking apparatuses are considered flammable (or inflammable), i.e., they have flash points of 80° F. or less in liquid form. As used herein, the term "flash point" refers to the lowest temperature at which a combustible liquid will give off a flammable vapor that can be ignited and that will burn momentarily. Thus, certain naphthas or liquid hydrocarbons boiling in the kerosine range and that generally form the basis of the most commercially available liquid charcoal lighters are considered flammable liquids. Likewise, most liquid fuels used in portable cooking apparatuses such as camping stoves and the like are considered flammable liquids. Since the propylene glycol used in the composition of the present invention is not considered a flammable liquid, no special shipping or handling instructions are required. More importantly, however, dangerous flare-ups upon ignition are eliminated. Despite its low flash point, it has surprisingly been found that when the propylene glycol is disposed on the substrate, it can readily be lit with a match, the flame soon spreading throughout the entire substrate to provide a highly desirable cooking flame over the area occupied by the substrate. Another advantage of the fuel composition of the present invention is the fact that it is substantially non-toxic and biodegradable. Propylene glycol is widely used in a variety of compositions that have human/animal applications such as in pharmaceutical preparations, flavorings extracts, perfumes, and cosmetics; in foods as a solvent, a wetting agent and a humectant; as an emulsifier; and in animal applications as a feed additive. Because of its low to non-existent toxicity, even if it does contact food that is being cooked, it is of no consequence.

The apparatus of the present invention includes a container, a non-combustible substrate, as described above, disposed in the container and propylene glycol disposed on the substrate. The container may take any form or shape that is adequate to hold a liquid, it generally being preferred that the container have a substantially flat bottom wall, and a peripherally extending side wall that projects upwardly from the bottom wall to define a mouth or opening of the container. The apparatus further includes a substrate, as described above, disposed in the container, preferably on the bottom wall and propylene glycol disposed on the substrate and optionally, but preferably, an amount of free propylene glycol disposed or pooled on the bottom wall. Although propylene glycol is extremely difficult to light, if it is simply spread on a flat surface, e.g., the bottom wall of the container, it will readily light when it is disposed on the substrate. In the apparatus of the present invention, as the propylene glycol on the substrate burns, the substrate is heated as described above. The heated substrate, it is believed, acts to raise the temperature of the liquid propylene glycol on the bottom wall sufficiently so that vapors of propylene glycol are soon burning with the result that the substrate continues to be heated and continues to heat the liquid propylene glycol on the bottom wall, which continues to vaporize and burn until all of the propylene glycol from the substrate and on the bottom wall is consumed.

The container can also be conveniently provided with a lid or cover (top wall) that completely covers the mouth of the container so that, when desired, the flame can be extinguished simply by placing the cover on the container. If at the time the flame is extinguished there is residual propylene glycol on the substrate and/or on the bottom wall of the container, at such time as it is desired to use the cooking apparatus again, it is only necessary to re-light the propylene glycol on the substrate and the process as described above repeated again to effect cooking and/or heating. The container and cover can be so constructed that the cover forms a liquid tight closure for the container making it easy to transport the heating apparatus, i.e., the container, the substrate and the propylene glycol.

While the propylene glycol can be used in essentially pure form, optionally, it can be admixed with ethanol and/or water in amounts up to about 10% by weight. Admixing the propylene glycol with ethanol provides a fuel composition with a slightly higher vapor pressure making it easier to light, particularly in very cold temperatures. The addition of water, with or without ethanol, provides a fuel composition that provides a steaming action as the water is boiled from the substrate thereby helping to keep foods moist during cooking.

Referring now to the Figure, there is shown the apparatus of the present invention as used in a typical portable or outdoor grill used for cooking purposes. In the Figure, there are actually two embodiments of the apparatus shown as will be described hereafter. The firebox 10 of a typical portable or outdoor grill G is provided with opposing side walls 12 and 14, opposing end walls 16 and 18 and a bottom wall 20 to form a generally rectangular housing having an open top. Disposed across the open top is a typical grate 22 upon which food such as hamburgers, steaks or other meat products can be disposed for cooking. It will be appreciated that in a typical case, the grill G would have charcoal briquets disposed on the bottom wall 20 that would be ignited using a liquid charcoal lighter.

Turning now to a first embodiment of the apparatus of the present invention, resting on bottom wall 20 of grill G is a first container C having a generally flat bottom wall 24 opposed side walls 26 and 28 and opposed end walls 30 and 32, walls 26, 28, 30 and 32 forming a peripherally extending side wall that projects upwardly from bottom wall 24 to form container C. Walls 26, 28, 30 and 32 also cooperate to form an open mouth 34 in container C. Disposed in container C and resting on bottom wall 24 are a plurality of substrate members 36, in the embodiment shown, substrate members 36 being lava rock, which is readily obtainable commercially. It will be appreciated that for clarity, the substrate members 36 are shown as being spaced some distance apart. In actual practice, substrate members 36 would be more closely packed together so as to form a generally continuous substrate bed. Also disposed in container C is an amount of propylene glycol 38, the propylene glycol 38 being on the substrate members 36 and also forming a pool on the bottom wall 24 of container C. As can also be seen, container C is provided with a removable lid or cover 40 having a handle 42, removable lid 40 being sized so as to snugly fit around the periphery of container C to thereby extinguish the flames in container C when the cooking/heating operation is to be terminated. To this end, grate 22 would be removed and cover or lid 40 would be placed over the mouth 34 of container C, depriving the flame of oxygen and snuffing it out.

Another embodiment of the heating apparatus of the present invention is also shown and is comprised of a container $C_1$ that has a bottom wall (not shown) that is generally flat and circular and has depending upwardly therefrom an annularly extending side wall 44. Disposed in container $C_1$ are substrate elements or members 36 and propylene glycol 38, propylene glycol 38 being disposed on the porous substrate members 36 and on the bottom wall of container $C_1$ as well. Although not shown, it will be apparent that container $C_1$ could be provided with a snug-fitting lid such as lid 40 to extinguish the flame when it was desired to terminate the cooking/heating operation.

To use the apparatuses shown in the Figure, it is only necessary to light the propylene glycol 38 disposed on the substrate members 36. As noted above, the propylene glycol will readily light on the substrate members 36 and as it burns, in addition to supplying heat for cooking purposes, will heat substrate members 36 as well as any pooled propylene glycol in container C or $C_1$, warming the pooled propylene glycol sufficiently to vaporize it to the point where the vapors will burn, thereby providing a soot-free flame for cooking. Moreover, the flame is spread generally throughout the container providing generally even heat distribution over the cooking area, i.e., the area under the containers C or $C_1$.

In actual experiments, it has been found that by soaking a plurality of lava rocks in propylene glycol and then disposing the propylene glycol laden lava rocks on the bottom surface of a fire box of a conventional grill so as to make a generally uniform bed of lava rocks of approximately 12"×12", it is possible to easily cook four to six standard sized hamburgers to the desired degree.

The foregoing description and examples illustrate selected embodiments of the present invention. In light thereof, variations and modifications will be suggested to one skilled in the art, all of which are in the spirit and purview of this invention.

What is claimed is:

1. A fuel composition for use in cooking food wherein said food is directly exposed to flame from the burning fuel composition comprising:
   a non-combustible, substantially heat resistant pervious substrate comprising lava rocks; and
   an amount of 1.2-propylene glycol disposed on said substrate sufficient to fill the majority of surface interstices present in said substrate.

2. The composition of claim 1 wherein said substrate comprises a plurality of individual pieces.

3. An apparatus for providing a heat source suitable for cooking wherein food is directly exposed to flames from the burning fuel used in the apparatus comprising;
   a container having a liquid impervious bottom wall and a peripheral side wall extending generally upward from said bottom wall to define a container mouth;
   a non-combustible, substantially heat resistant pervious substrate comprising lava rocks disposed in said container; and
   1,2-propylene glycol disposed on said substrate sufficient to fill the majority of surface interstices present in said substrate.

4. The apparatus of claim 3 further including a removable cover for disposing over said mouth of said container.

5. The apparatus of claim 3 wherein said bottom wall is planar.

6. The apparatus of claim 3 wherein said substrate comprises a plurality of individual pieces.

7. The apparatus of claim 3 wherein said propylene glycol is in an amount sufficient to fill the majority of surface interstices present in said substrate and to form a deposit of said propylene glycol on said bottom wall.

* * * * *